US008081306B2

(12) United States Patent   (10) Patent No.: US 8,081,306 B2
Klar et al.                  (45) Date of Patent:     Dec. 20, 2011

(54) METHOD AND SYSTEM FOR LOCALIZING AN ATTENUATION CHANGE LOCATION IN AN OPTICAL WAVEGUIDE

(75) Inventors: Andreas Klar, Meiningen (DE); Michael Eiselt, Kirchheim (DE)

(73) Assignee: ADVA AG Optical Networking, Martinsried/Munich (DE)

( * ) Notice: Subject to any disclaimer, the term of this patent is extended or adjusted under 35 U.S.C. 154(b) by 926 days.

(21) Appl. No.: 12/052,006

(22) Filed: Mar. 20, 2008

(65) Prior Publication Data

US 2008/0232795 A1 Sep. 25, 2008

(30) Foreign Application Priority Data

Mar. 21, 2007 (DE) .................. 10 2007 013 606

(51) Int. Cl.
*G01N 21/00* (2006.01)
(52) U.S. Cl. ......................... 356/73.1; 398/14
(58) Field of Classification Search ............. 356/73.1; 398/9–38
See application file for complete search history.

(56) References Cited

U.S. PATENT DOCUMENTS

| 5,179,420 | A | 1/1993 | So et al. |
| 6,046,797 | A * | 4/2000 | Spencer et al. ............ 356/73.1 |
| 6,185,020 | B1 | 2/2001 | Horiuchi et al. |
| 6,879,386 | B2 | 4/2005 | Shurgalin et al. |
| 7,042,559 | B1 | 5/2006 | Frigo et al. |
| 2004/0208525 | A1 | 10/2004 | Seydnejad et al. |
| 2007/0274712 | A1 | 11/2007 | Leppla et al. |

FOREIGN PATENT DOCUMENTS

| EP | 0823621 | 2/1998 |
| EP | 1796295 | 6/2007 |

OTHER PUBLICATIONS

English language Abstract of EP 1796295.

* cited by examiner

*Primary Examiner* — Tarifur Chowdhury
*Assistant Examiner* — Tara S Pajoohi
(74) *Attorney, Agent, or Firm* — Greenblum & Bernstein, P.L.C.

(57) ABSTRACT

The invention provides a method and a system for localizing an attenuation change location in an optical waveguide, wherein the attenuation change location can be determined depending on a time difference ($\Delta T$) between signal power change instants of optical signals having different wavelengths ($\lambda_1, \lambda_2$) that are transmitted via the optical waveguide.

31 Claims, 12 Drawing Sheets

Fig. 1
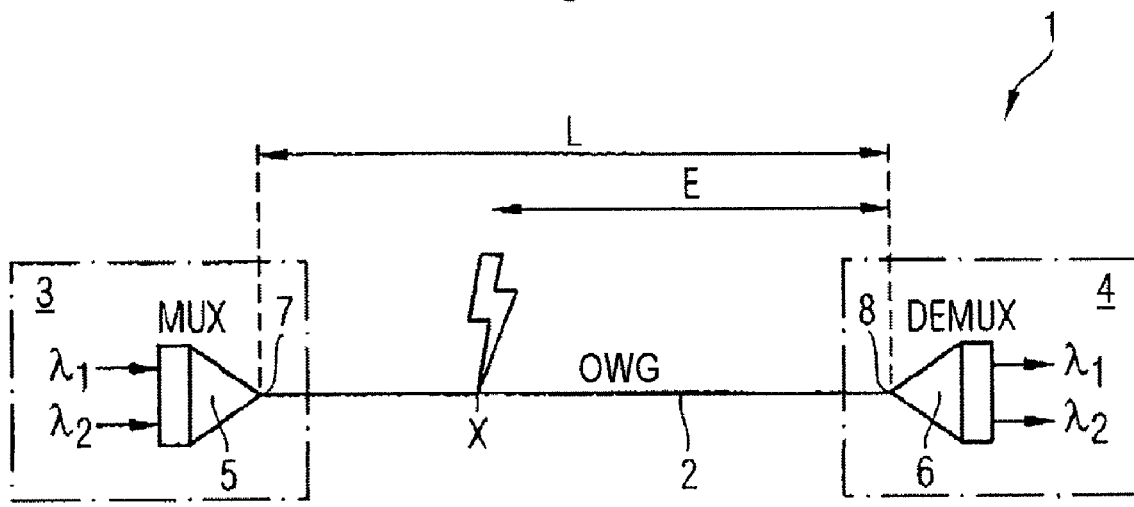
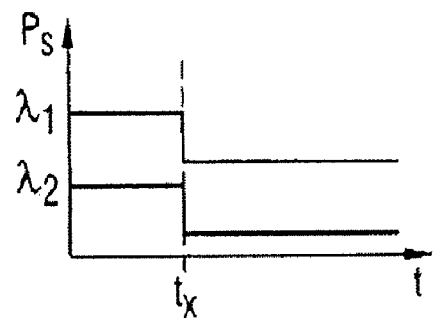
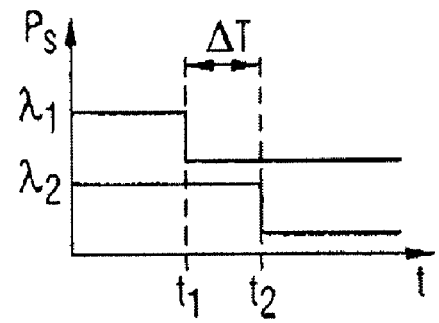

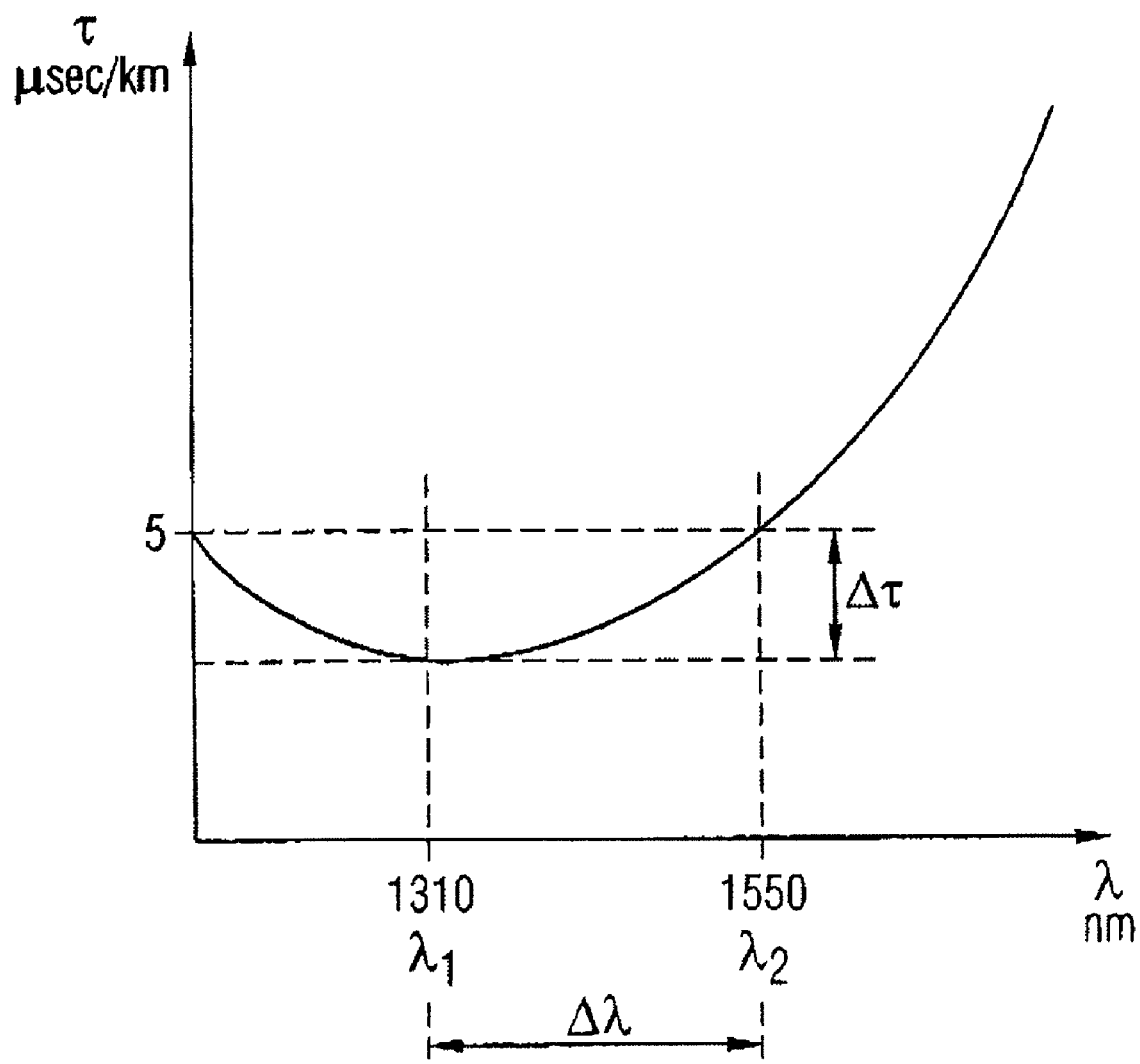

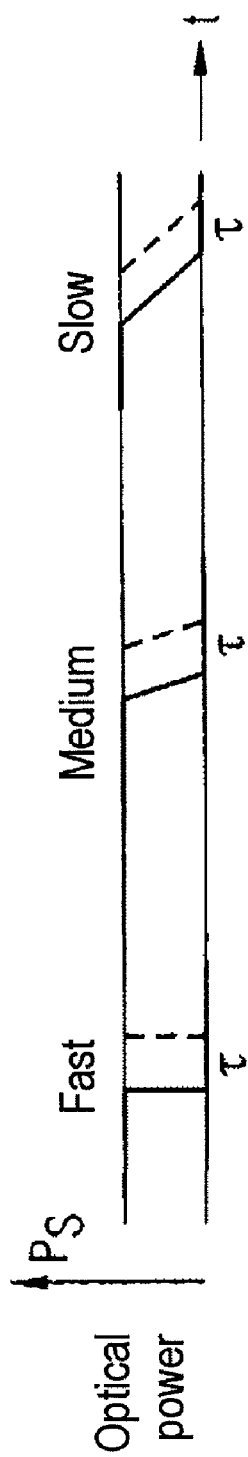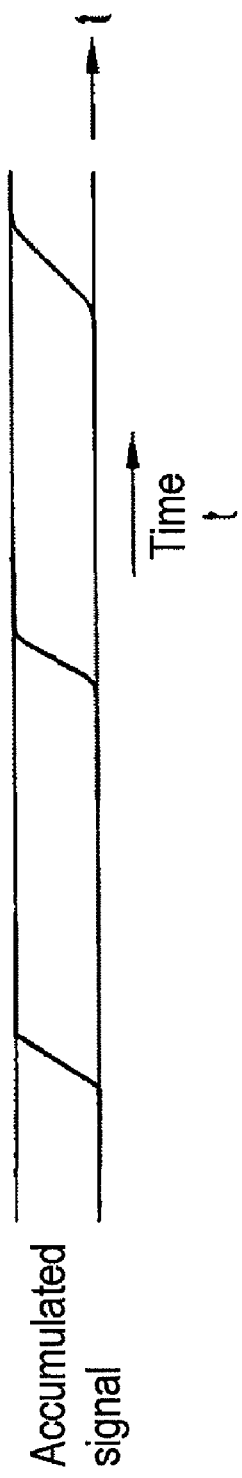
Fig. 3A
Fig. 3B
Fig. 3C

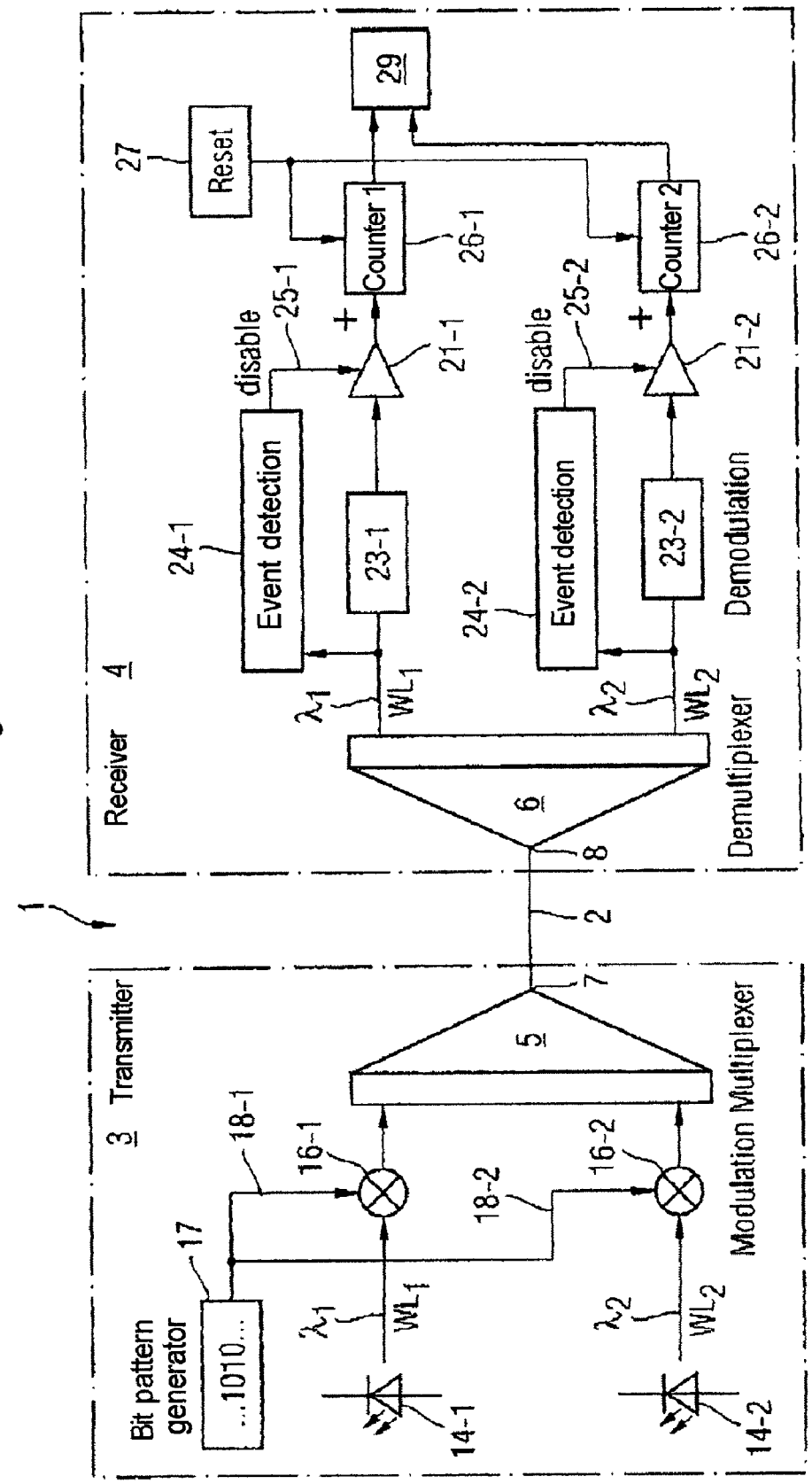

METHOD AND SYSTEM FOR LOCALIZING AN ATTENUATION CHANGE LOCATION IN AN OPTICAL WAVEGUIDE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to a method and a system for localizing an attenuation change location in an optical waveguide within an optical transmission system.

(2) Description of the Related Art

In an optical transmission system, data are transmitted by light pulses via an optical waveguide between a transmitter and a receiver. The length of such an optical waveguide can be a number of kilometers. The optical waveguide is formed for example by a fibre-optic cable. The optical waveguide is composed of mineral glass, for example silica glass, or of organic glass or plastic. An optical waveguide is a dielectric waveguide. An optical waveguide is used primarily as transmission medium for line-conducted telecommunications methods. However, optical waveguides are also used for the transmission of energy, for example for the transmission of UV light for illumination purposes, and in metrology for example in infrared thermometers and spectrometers.

Fibre-optic cables are used in communications technology primarily for transmitting information over wide distances with a high bandwidth. In the case of optical fibres a distinction is made between graded-index fibres and stepped-index fibres. The refractive index decreases towards the outside in the radial direction continuously in the case of graded-index fibres, and in stepwise fashion in the case of a stepped-index fibre. The so-called multimode optical fibres can be formed as graded-index fibres and as stepped-index fibres. In contrast thereto, single-mode optical fibres are formed primarily by stepped-index fibres. In the case of a multimode optical fibre, different individual light waves (modes) are used for signal transmission. On account of a plurality of possible light paths, instances of signal influencing occur on account of propagation time differences, such that multimode optical fibres are less suitable than single-mode optical fibres for transmitting messages over large distances at a high bandwidth. Single-mode optical fibres can bridge distances of hundreds of kilometers without repeaters, i.e. without intermediate amplification.

One disadvantage of conventional optical transmission systems is that in the event of a disturbance of the optical waveguide, for example as a result of a fracture of the optical fibre on account of construction work, the location of the disturbance cannot be localized in order to rectify the disturbance.

A further disadvantage of conventional optical transmission systems consists in the risk that the transmitted light signals can be coupled out by bending of the optical waveguide, such that the transmitted information can be intercepted by third parties without the receiver being able to ascertain this.

BRIEF SUMMARY OF THE INVENTION

Therefore, one object of the present invention is to provide a method and an optical transmission system for localizing an attenuation change location in an optical waveguide.

A further object of the invention is to provide an interception-proof optical signal transmission system.

The invention provides a method for localizing an attenuation change location in an optical waveguide, wherein the attenuation change location is determined depending on a time difference between signal power change instants of optical signals having different wavelengths that are transmitted via the optical waveguide.

In one embodiment of the method according to the invention, at least two optical signals having different wavelengths are fed in at a first end of the optical waveguide and the signal power of the respective optical signal is measured at a second end of the optical waveguide.

In one embodiment of the method according to the invention, the optical signals are in each case generated by a laser.

In one embodiment of the method according to the invention, the optical signals generated are fed into the optical waveguide at the first end of the optical waveguide by means of an optical multiplexer.

In one embodiment of the method according to the invention, the optical signals are separated at a second end of the optical waveguide by means of an optical demultiplexer.

In one embodiment of the method according to the invention, a distance E between the attenuation change location and the second end of the optical waveguide is determined as follows:

$$E = \frac{|t_1 - t_2|}{D_{av}|\lambda_1 - \lambda_2|} = \frac{\Delta T}{D_{av}\Delta\lambda}$$

where
$t_1$ is a signal power change instant of a first optical signal,
$t_2$ is a signal power change instant of a second optical signal,
$\lambda_1$ is the wavelength of the first optical signal,
$\lambda_2$ is the wavelength of the second optical signal,
$D_{av}$ is an average dispersion coefficient,
$\Delta\lambda$ is a wavelength difference between the wavelengths $\lambda_1, \lambda_2$ of the first and second optical signals, and
$\Delta T$ is the time difference between the signal change instants $t_1, t_2$.

In one embodiment of the method according to the invention, the time difference $\Delta T$ is determined by means of counters at the second end of the optical waveguide.

In one embodiment of the method according to the invention, the optical signals are transmitted in unmodulated or modulated fashion via the optical waveguide.

In one embodiment of the method according to the invention, at least two modulated optical signals having different wavelengths are transmitted via the optical waveguide.

In one embodiment of the method according to the invention, a modulated optical signal having a first wavelength and an unmodulated optical signal having a second wavelength are transmitted via the optical waveguide.

In one embodiment of the method according to the invention, optical signals having different wavelengths are fed in at both ends of the optical waveguide and their signal power is measured at the respective opposite end of the optical waveguide.

In one embodiment of the method according to the invention, at least two unmodulated optical signals having different wavelengths are transmitted via the optical waveguide, wherein when an attenuation change is ascertained, a cross-correlation function for the two transmitted optical signals is calculated, the maximum of which indicates the time difference between the signal power change instants.

In one embodiment of the method according to the invention, optical signals having different wavelengths and time marker data patterns periodically modulated thereon are transmitted via the optical waveguide.

In one embodiment of the method according to the invention, the total length L of the optical waveguide is determined in a reference measurement.

In one embodiment of the method according to the invention, the total length of the optical waveguide is determined by bringing about an attenuation of two optical signals having different wavelengths at a first end of the optical waveguide.

In one embodiment of the method according to the invention, the attenuation brought about at the first end of the optical waveguide is brought about by means of an optical switch.

The invention furthermore provides a method for measuring a length of an optical waveguide, wherein at least two optical signals having different wavelengths are fed in at a first end of the optical waveguide and their signal power is measured at a second end of the optical waveguide, wherein an attenuation is brought about at the first end of the optical waveguide and the length of the optical waveguide is determined depending on a time difference between signal power change instants of the optical signals transmitted via the optical waveguide.

In one embodiment of the method according to the invention, the attenuation is brought about at the first end of the optical waveguide by the opening of an optical switch provided there.

The invention furthermore provides a method for secure signal transmission of optical data signals via an optical waveguide, wherein, alongside the optical data signals, at least two optical monitoring signals having different wavelengths are fed in at a first end of the optical waveguide and the signal power of the optical monitoring signals is measured at a second end of the optical waveguide, wherein a bending of the optical waveguide for coupling out the optical data signals brings about an attenuation change, the location of which is determined depending on a time difference $\Delta T$ between the signal power change instants of the optical monitoring signals transmitted via the optical waveguide.

The invention furthermore provides a system for localizing an attenuation change location in an optical waveguide, wherein the attenuation change location can be determined depending on a time difference $\Delta T$ between signal power change instants of optical signals having different wavelengths $\lambda$ that are transmitted via the optical waveguide.

In one embodiment of the system according to the invention, said system has a transmitter for feeding at least two optical signals having different wavelengths into the optical waveguide, and a receiver, which measures the time difference between the signal power change instants of the optical signals transmitted via the optical waveguide and determines the attenuation change location from the measured time difference.

In one embodiment of the system according to the invention, the transmitter has a controllable optical multiplexer for feeding the optical signals having different wavelengths into the optical waveguide.

In one embodiment of the system according to the invention, the transmitter has lasers for generating the optical signals having different wavelengths.

In one embodiment of the system according to the invention, the transmitter is provided with modulators by means of which in each case an associated optical signal can be modulated by a data bit pattern generated by a bit pattern generator.

In one embodiment of the system according to the invention, the receiver has a controllable optical demultiplexer for separating the transmitted optical signals having different wavelengths $\lambda$.

In one embodiment of the system according to the invention, the transmitter has, for each transmitted separated optical signal, a detector for detecting a signal power change in the transmitted optical signal.

In one embodiment of the system according to the invention, the detectors provided in the receiver trigger at least one counter for measuring the time difference $\Delta T$ between the signal power change instants of the optical signals transmitted via the optical waveguide.

In one embodiment of the system according to the invention, the receiver is provided with a cross-correlation calculation unit, which, when a signal power change is ascertained, calculates a cross-correlation function for two transmitted optical signals, the maximum of which indicates the time difference $\Delta T$ between the signal power change instants.

In one embodiment of the system according to the invention, the attenuation change location is an optical waveguide fracture.

In one embodiment of the system according to the invention, the attenuation change location is a bending location of the optical waveguide.

In one embodiment of the system according to the invention, the optical waveguide is composed of glass.

In one embodiment of the system according to the invention, the optical waveguide is composed of plastic.

The invention furthermore provides a receiver for localizing an attenuation change location for an optical waveguide, wherein the receiver measures a time difference $\Delta T$ between signal power change instants of at least two optical signals having different wavelengths that are transmitted via the optical waveguide, and determines the attenuation change location from the measured time difference $\Delta T$.

In one embodiment of the receiver according to the invention, the receiver has:
  an optical demultiplexer for separating the transmitted optical signals having different wavelengths;
  detectors for detecting a signal power change of an associated separated optical signal;
  at least one counter which can be triggered for measuring a time difference $\Delta T$ between signal power change instants of the separated optical signals by the detectors; and
  an evaluation unit, which determines the attenuation change location depending on the measured time difference $\Delta T$.

In one embodiment of the receiver according to the invention, the receiver has:

an optical demultiplexer for separating the transmitted optical signals having different wavelengths;

a cross-correlation calculation unit, which, when a signal power change is ascertained, calculates a cross-correlation function for two separated transmitted optical signals, the maximum of which indicates a time difference $\Delta T$ between the signal power change instants; and an evaluation unit which determines the attenuation change location depending on the time difference $\Delta T$.

The invention furthermore provides a measuring system for measuring a length L of an optical waveguide, wherein at least two optical signals having different wavelengths $\lambda$ are fed in at a first end of the optical waveguide and their signal power is measured at a second end of the optical waveguide, wherein an attenuation is brought about at the first end of the optical waveguide and the length L of the optical waveguide can be determined depending on a time difference $\Delta T$ between signal power change instants of the optical signals transmitted via the optical waveguide.

The invention furthermore provides an interception-proof optical signal transmission system, wherein, alongside optical data signals, at least two optical monitoring signals having different wavelengths $\lambda$ are fed in at a first end of an optical waveguide of the optical signal transmission system and the signal powers of the two optical monitoring signals are measured at a second end of the optical waveguide, wherein a bending of the optical waveguide for coupling out the optical data signals brings about an attenuation change, the location of which can be determined depending on a time difference $\Delta T$ between signal power change instants of the optical monitoring signals transmitted via the optical waveguide.

BRIEF DESCRIPTION OF THE SEVERAL VIEWS OF THE DRAWINGS

Exemplary embodiments of the method and system according to the invention for localizing an attenuation change location in an optical waveguide and of the method and system according to the invention for the interception-proof signal transmission of optical data signals via an optical waveguide are described below with reference to the accompanying figures for elucidating features essential to the invention.

FIG. 1 shows an exemplary embodiment of a system for localizing an attenuation change location in an optical waveguide according to the invention;

FIG. 2 shows a function diagram for elucidating the functioning of the method according to the invention for localizing an attenuation change location in an optical waveguide;

FIGS. 3A, 3B and 3C show signal diagrams for representing a differential signal monitoring in accordance with one embodiment of the method according to the invention;

FIG. 9 shows a block diagram for representing an embodiment of the system according to the invention for localizing an attenuation change location in an optical waveguide;

DETAILED DESCRIPTION OF THE INVENTION

Figure 4:
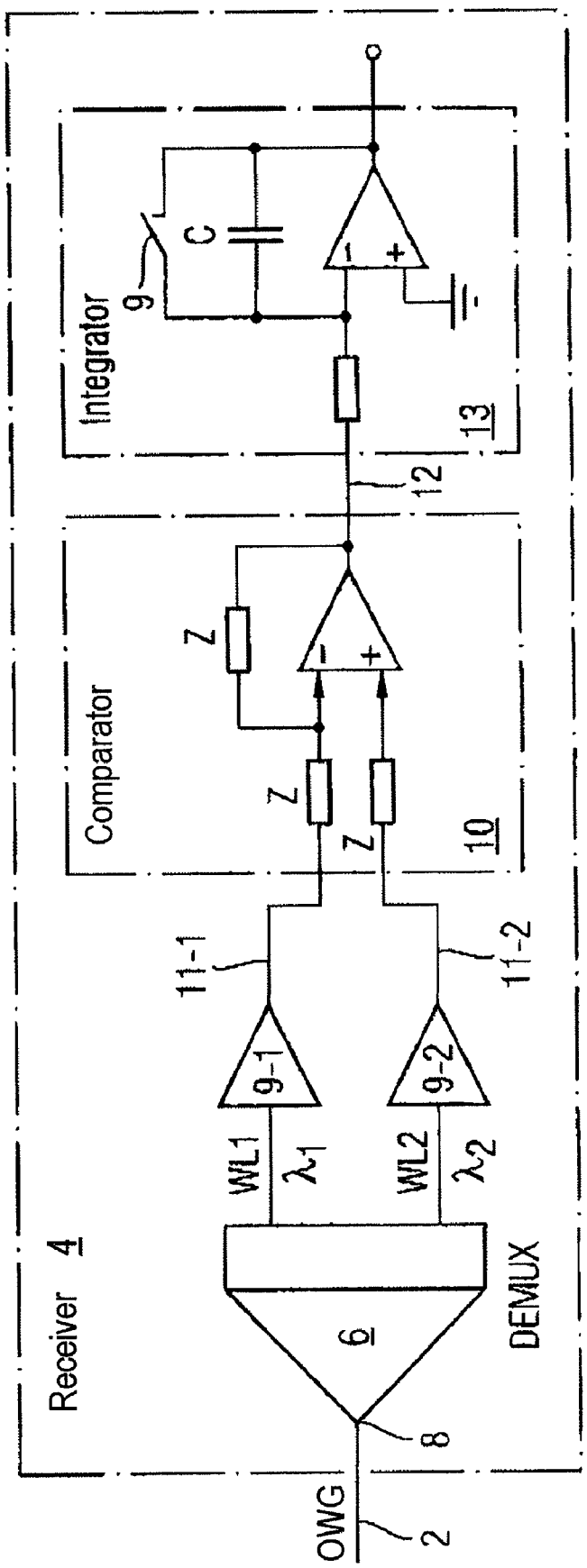
FIG. 4 shows an exemplary embodiment of a receiver for carrying out a differential signal monitoring as is used in an embodiment of the method according to the invention for localizing an attenuation change location in an optical waveguide.

As can be discerned from FIG. 1, the system 1 according to the invention for localizing an attenuation change location in an optical waveguide 2 has a transmitter 3 for transmitting at least one optical data signal to a receiver 4, which receives the optical data signal transmitted via the optical waveguide 2. The optical waveguide 2 is composed of glass or plastic, for example. Only one optical waveguide 2 is illustrated in the exemplary embodiment illustrated in FIG. 1. In an alternative embodiment of the optical transmission system 1, a plurality or a multiplicity of optical waveguides 2 are laid in parallel for example within a bunched cable. For each optical waveguide 2, an optical multiplexer 5 is provided at the transmitter 3 end and an optical demultiplexer 6 is provided at the receiver 4 end. The length of the optical waveguide is L. In the example illustrated in FIG. 1, an attenuation change can occur at a location X, said attenuation change being brought about for example by an optical fibre fracture. The optical waveguide 2 has a first end 7 and a second end 8. The distance E between the attenuation change interface X and the second end 8 of the optical waveguide is designated by E in FIG. 1.

In the method according to the invention for localizing the attenuation change location X in the optical waveguide 2, the attenuation change location X is determined depending on a time difference $\Delta T$ between signal power change instants of optical signals having different wavelengths $\lambda$ that are transmitted via the optical waveguide 2.

For this purpose, by way of example, at least two optical signals having different wavelengths $\lambda_1$, $\lambda_2$ are fed in at the first end 7 of the optical waveguide 2 and the signal power P of the respective optical signals is measured at the second end 8 of the optical waveguide 2, that is to say at the receiver 4 end.

The method according to the invention for localizing the attenuation change location X in the optical waveguide 2 makes use of the different group velocity or propagation velocity of optical signals having different wavelengths $\lambda$ in the optical waveguide 2, that is to say the chromatic dispersion of the optical waveguide 2. The propagation velocity of light is dependent on the refractive index of the transmitting medium and the form of the waveguide, both of which are wavelength-dependent. This brings about an expansion during transmission in the case of light pulses. If an external event, for example an optical fibre fracture at the location X at the instant tx, brings about an attenuation increase for the transmitted optical signals, said attenuation increase can be detected as a reduction of the received optical signal power $P_s$ at the receiver 4 at a time $t+\Delta t(\lambda)$. In this case, the propagation time $\Delta t$ depends on the wavelength $\lambda$ of the optical signal:

$$\Delta t(\lambda)=E/V_G(\lambda),$$

where $V_G(\lambda)$ is a wavelength-dependent group velocity of the optical signal.

For two optical signals having different wavelengths $\lambda_1$, $\lambda_2$, in the method according to the invention the power decrease in the transmitted optical signal is detected at different instants $t1=t+\Delta t(\lambda)$ and $t2=t+\Delta t(\lambda_2)$.

From the time difference $\Delta T$ between the signal power change instants t1, t2 at the receiver 4 end, the location of the attenuation change location X can be determined:

$$\tau = |t_1 - t_2|$$
$$= \left| \frac{E}{v_g(\lambda_1)} - \frac{E}{v_g(\lambda_2)} \right|$$
$$= E \cdot D \cdot |\lambda_1 - \lambda_2|$$
$$= E \cdot D \cdot \Delta\lambda \Rightarrow E$$
$$= \left| \frac{t_1 - t_2}{D \cdot \Delta\lambda} \right|$$

where
$t_1$ is the signal power change instant of the first received optical signal having the wavelength $\lambda_1$,
$t_2$ is the signal power change instant of the second received optical signal having the wavelength $\lambda_2$,
D is an average dispersion coefficient of the transmission medium or optical waveguide,
$\Delta\lambda$ is the wavelength difference between the wavelengths $\lambda_1$, $\lambda_2$ of the first and second optical signals, and
$\Delta T$ is the time difference between the signal power change instants $t_1$, $t_2$.

FIG. 2 shows a diagram for representing the dependence of a group delay $\tau$ or propagation velocity as a function of the wavelength $\lambda$ of the light signal.

The optical signals transmitted in the method according to the invention have different wavelengths $\lambda$, the optical signals being generated by lasers, for example. The laser manufacturers specify the wavelength $\lambda$ of the generated light signal in a vacuum. The speed of light C for the transmission of light in different materials depends on the refractive index n of the material:

$$C = \frac{C_0}{n} = \frac{\text{Speed of light in a vacuum } C_0}{\text{refractive index}}$$

In the case of glass, the refractive index n is approximately 1.5, that is to say that the speed C of the transmitted light of glass is approximately 200,000 km/sec. If a laser generates light having a frequency of 200 THz, for example, this corresponds to a wavelength $\lambda$ in air (n=1) of approximately 1500 nm and a wavelength of approximately 1000 nm in the glass fibre (n=1.5).

FIG. 2 shows the dependence of the group velocity T as a function of the wavelength $\lambda$ in the case of a standard single-mode optical fibre. The profile can be influenced by changing the geometry and the doping level. Typical values for the group velocity $\tau$ are approximately 5 µsec./km.

The dispersion D results from the ratio between the group delay difference $\Delta\tau$ and the wavelength difference $\Delta\lambda$.

$$D=\Delta\tau/\Delta\lambda$$

In one possible embodiment of the system according to the invention, the wavelength $\lambda_1$ of a first optical signal is approximately 1310 nm and the wavelength $\lambda_2$ of a second optical signal is approximately 1550 nm.

In the method according to the invention, the distance E between the disturbance location X and the receiver 4 can be calculated from the observation of the power profile P of the received optical signals having different wavelengths $\lambda_1$, $\lambda_2$ at the receiver 4 on the basis of the dispersion coefficient D and the wavelength separation $\Delta\lambda$.

FIGS. 3A, 3B, 3C show the signal diagrams for representing a differential signal monitoring in one embodiment of the method according to the invention for localizing an attenuation change location in an optical waveguide 2.

The signal diagrams show the time profile of a signal power P of an optical signal received at the receiver end, the time profile of a differential signal, and the time profile of an integrated differential signal in each case for a fast, medium and slow attenuation change.

FIG. 4 shows an exemplary embodiment of a receiver 4 for carrying out a differential signal monitoring. The optical signals having the different wavelengths $\lambda_1$, $\lambda_2$ are separated from one another by the optical demultiplexer contained in the receiver 4. The separated optical signals are amplified by signal amplifiers 9-1, 9-2 before being output to a differential amplifier or comparator 10. The signal amplifiers 9-1, 9-2 have an adjustable signal gain, wherein an amplitude matching is carried out in such a way that in the quiescent state, the amplitude difference is zero and the voltage on 11-1 and 11-2 has a predetermined value. Said value serves later as a reference for the assessment of the output signal.

In the embodiment illustrated in FIG. 4, the two optical signals having different wavelengths $\lambda_1$, $\lambda_2$ are transmitted in unmodulated fashion. The signals output by the signal amplifiers 9-1, 9-2 are electrical signals which are output via the lines 11-1, 11-2 to the electrical differential amplifier 10. The electrical differential amplifier 10 comprises an operational amplifier and impedances Z, wherein the output of the operational amplifier is coupled with feedback via feedback impedance to the inverting signal input of the operational amplifier. The output signal of the differential amplifier 10 is proportional to the difference between the two electrical signals applied. The differential signal output by the differential amplifier 10 is output via a line 12 to a signal integrator 13 connected downstream. The signal integrator 13 likewise comprises an operational amplifier, wherein the output of the operational amplifier is coupled with feedback via a capacitor 10 to the inverting signal input of the operational amplifier. The signal integrator 13 carries out an accumulation of the signal output by the differential amplifier 10.

FIG. 3B shows the (inverted) output signal of the differential amplifier 10 and FIG. 3C shows the accumulated signal output by the signal integrator 13.

In the case of normal operation, a signal having the amplitude 0 is present at the output of the differential amplifier 10. If an attenuation change occurs in the optical waveguide 2, the signal power change of the optical signal becomes apparent firstly on one of the two transmitted optical signals, that is to say in the case of an optical signal having a first wavelength $\lambda_1$, such that the output signal of the differential amplifier 10 has an amplitude not equal to zero for a certain time. As soon as the signal power change $\Delta P$ reaches the receiver 4 also in the case of the other optical signal having the other wavelength $\lambda_2$, the signal powers P of the two optical signals are identical again and the differential amplifier 10 outputs an output signal having the amplitude 0. The average signal power in both optical signals is fixedly retained before and after the attenuation change. If the signal power difference between the two optical signals having different wavelengths $\lambda$ has fallen to zero again, the output signal accumulated by means of the capacitor C within the signal integrator 13 is read out.

The accumulated output signal is converted into a digital signal for example by an analogue/digital converter. An evaluation unit then calculates the distance E between the attenuation change location X and the receiver 4 from the ascertained time difference $\Delta T$ between the signal power change instants $t_1$, $t_2$ of the two optical signals having different wavelengths $\lambda_1$, $\lambda_2$. By means of a switch S, the signal integrator 13 is reset again after measurement has been effected.

As can be discerned from the signal diagrams in FIGS. 3A, 3B, 3C, the type of attenuation change can be deduced from the profile of the differential signal or from the profile of the accumulated signal, that is to say that it is possible to determine whether the attenuation change took place rapidly or slowly. A fast attenuation change gives an indication that an abrupt optical fibre fracture took place, for example, while a slow attenuation change may have other causes. What is more, the extent of the attenuation change can be determined from the amplitude of the differential signal. The higher the amplitude of the differential signal, the higher the increase in the attenuation. An optical fibre fracture leads for example to a high amplitude of the differential signal, while a bending of the optical fibre leads to a smaller amplitude of the differential signal. In the method according to the invention, therefore, it is possible to ascertain whether an optical waveguide for data transmission fails completely and an immediate repair is therefore necessary. Furthermore, on the basis of the profile of the differential signal or of the accumulated signal it is possible to ascertain whether an optical fibre is bent and an undesired interception attempt is possibly present.

Figure 5:
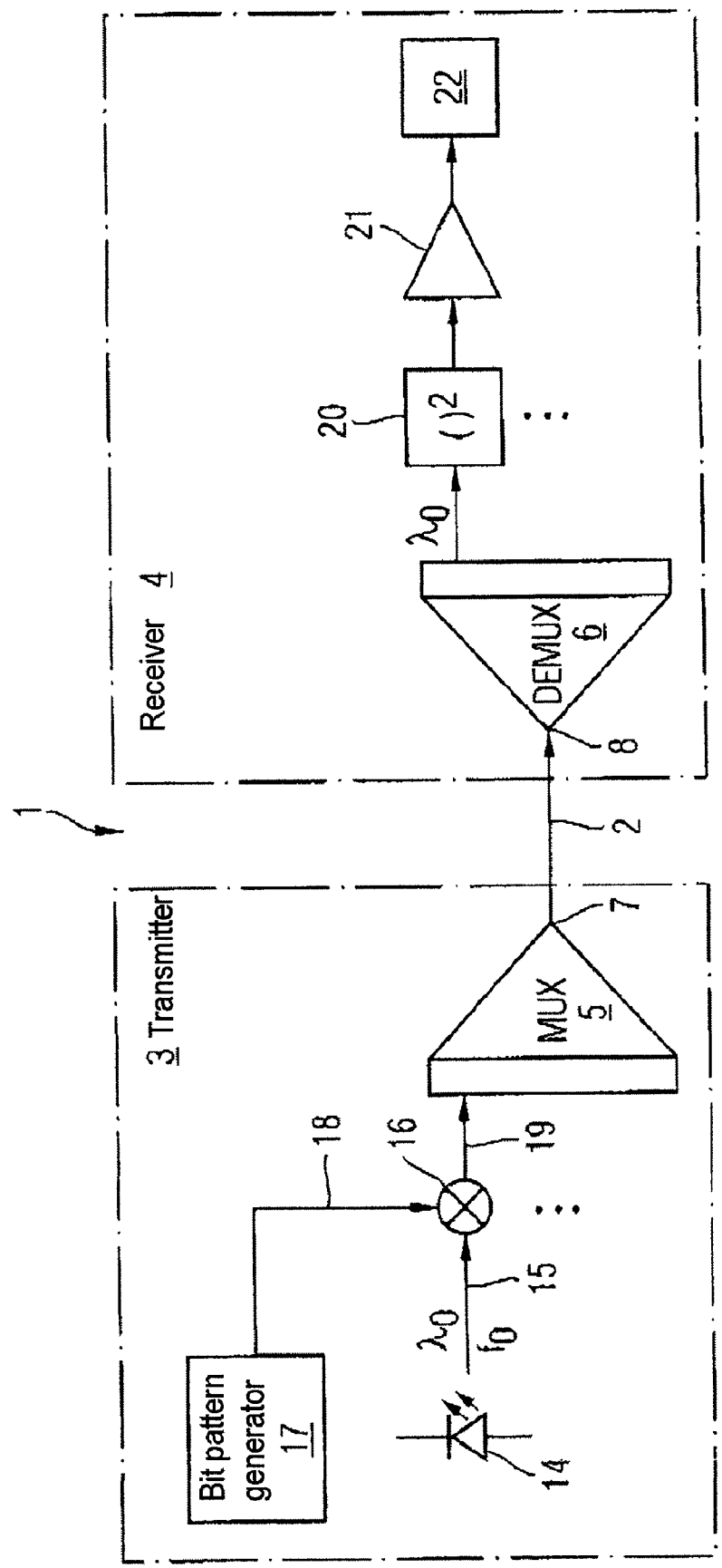
FIG. 5 shows an exemplary embodiment of a system for localizing an attenuation change location in an optical waveguide according to the invention.

FIG. 5 shows a block diagram of one possible embodiment of the system 1 according to the invention for localizing an attenuation change location X. In this embodiment, the optical signals are transmitted in modulated fashion. A laser 14 within the transmitter 3 generates an optical signal having a wavelength $\lambda$, which is fed via an internal line 15 to a modulator 16 of the transmitter 3. The modulator 16 modulates the optical signal with a data bit pattern which is generated by a bit pattern generator 17 and is applied to the modulator 16 via a line 18. The modulated optical signal is then transmitted via a signal line 19 to an input of the optical multiplexer 5 and is fed in by the optical multiplexer 5 at the first end 7 of the optical waveguide 2. The light signal is transmitted from the first end 7 of the optical waveguide 2 to the second end 8 of the optical waveguide 2 and separated again from the rest of the optical light signals by the optical demultiplexer 6 of the receiver 4. The separated optical signal is demodulated by a demodulation unit 20 within the receiver 4, for example by a photodiode. In the case of a photodiode, the current generated is proportional to the square of the electric field strength. The demodulated signal is amplified by a signal amplifier 21 before being output to a threshold value decision unit 22, which converts the analogue signal into a digital signal and outputs it to an evaluation unit (not illustrated). In an alternative embodiment, the demodulation is effected by a reference oscillator. The signal output by the signal amplifier 21 is a data sequence superposed with analogue noise. The threshold value decision unit 22 suppresses said analogue noise.

Figure 6:
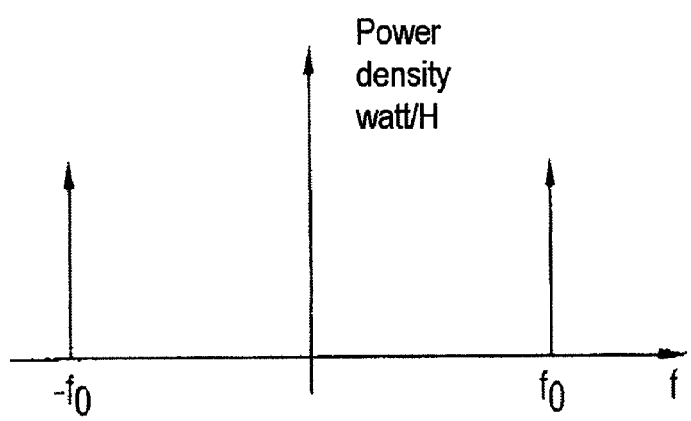
FIG. 6 shows a signal power spectrum for elucidating functioning of the method according to the invention.

FIG. 6 shows a signal power spectrum of an optical signal output by the laser 14, having the wavelength $\lambda_0$ and the frequency $f_0$.

Figure 7A:
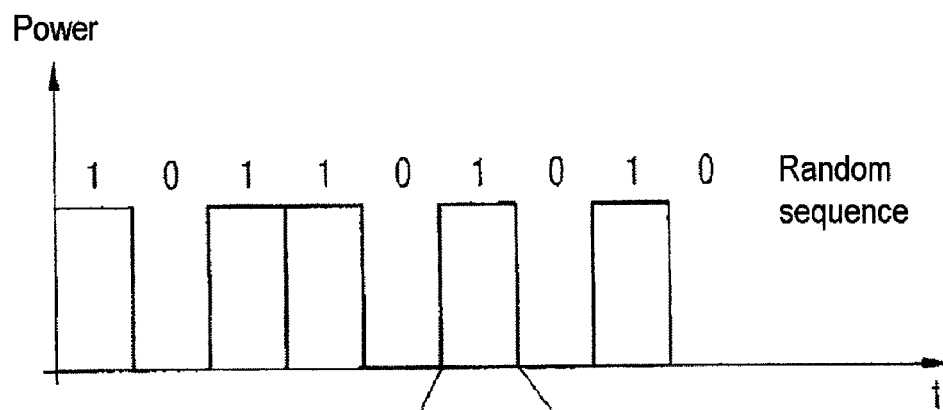
FIGS. 7A, 7B show diagrams for elucidating the functioning of an embodiment of the method according to the invention for localizing an attenuation change location.

FIG. 7A shows a random bit pattern which is generated by the bit pattern generator 17 and is used to perform a modulation of the optical signal. The bit pattern sequence generated by the bit pattern generator 17 can be a random data sequence or a periodically deterministic data sequence for example "10101010 . . . ".

Figure 7B:
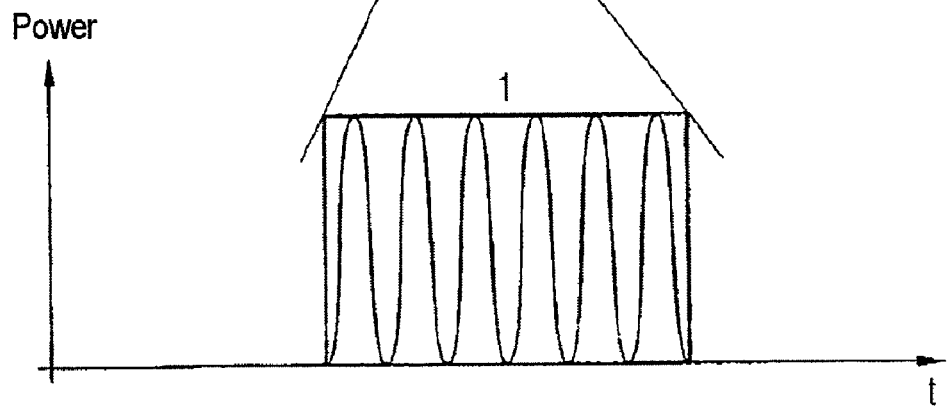

FIG. 7B shows a modulation of the data bit sequence generated by the bit pattern generator 17 with the carrier frequency $f_0$.

Figure 8A:
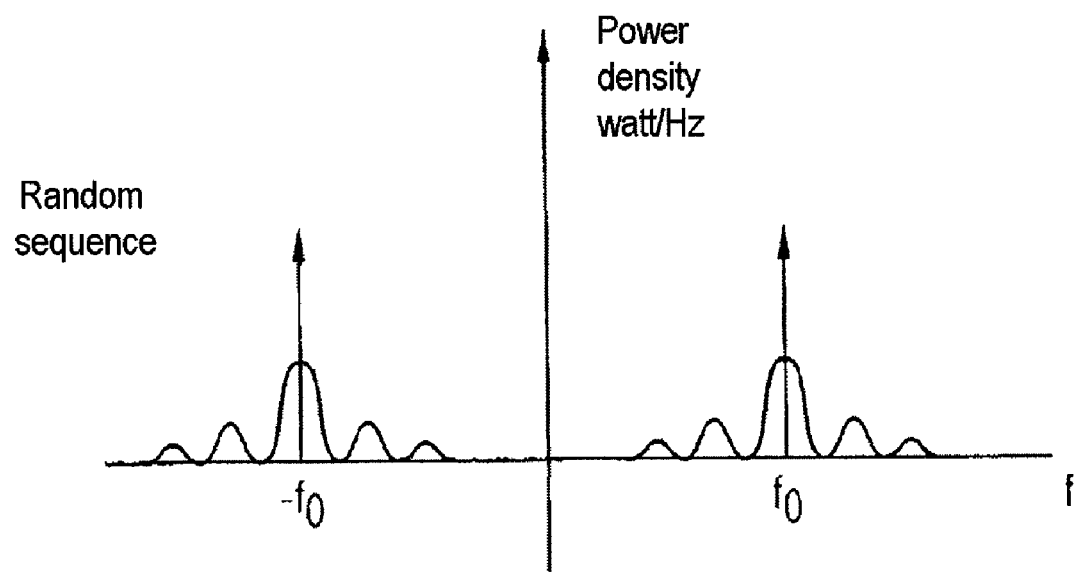
FIGS. 8A, 8B show signal power spectra for representing the exemplary embodiments of the method according to the invention for localizing an attenuation change location.

FIG. 8A shows the spectrum of a modulated optical signal which is output by the modulator 16 in FIG. 5. The signal spectrum of the random bit sequence generated by the bit pattern generator 17 is shifted around the carrier frequency $f_0$. The carrier frequency $f_0$ is approximately 200 THz, for example, while the frequency of the useful signal is a few GHz.

FIG. 8A shows a spectrum of a modulated optical signal in which the data bit pattern which is modulated thereon and is generated by the bit pattern generator 17 is a random data bit pattern, thus resulting in a continuous spectrum around the carrier frequency $f_0$.

Figure 8B:
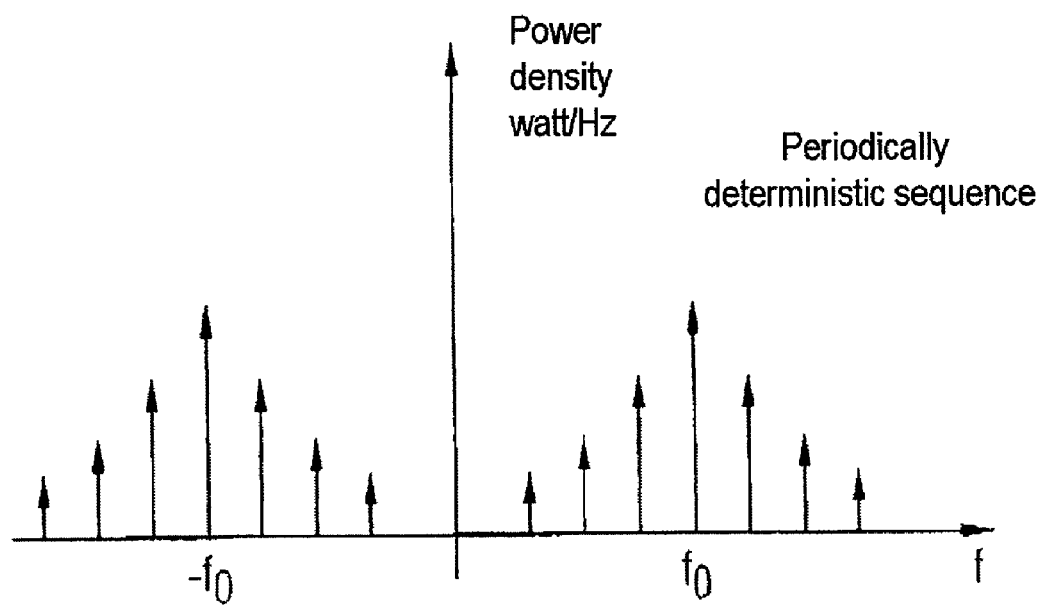

When using a periodically deterministic data bit sequence, for example a data bit sequence "10101010", the continuous spectrum becomes a line spectrum, as is illustrated in FIG. 8B.

The modulation of the optical signal can be performed by various modulation methods, for example by frequency modulation, phase modulation, PSK, etc. If the transmitter 3 has a laser 14 that generates an optical signal having a wavelength of $\lambda=1310$ nm, for example, then the carrier frequency $f_0$ results as follows:

$$f_O = c_0/\lambda_0 = 3 \cdot 10^8 {}^m/_{sec}/1310 \cdot 10^{-9} \, m = 229 \cdot 10^{12} \, \text{Hz}$$

If the transmitter 3 transmits a second optical signal having a wavelength $\lambda=1550$ nm, the carrier frequency $f_0$ results as $193.5 \cdot 10^{12}$ Hz.

In the embodiment illustrated in FIG. 5, the modulation of the optical signal is effected by modulating the intensity of the optical signal directly with the bit sequence generated by the bit pattern generator 17. The demodulation of the optical signal within the receiver 4 is effected by means of a photodiode, for example, which represents a non-linear component. The non-linear demodulation by means of the photodiode also gives rise to signal components at double the carrier frequency $f_0$ and at the frequency 0. The signal components at double the carrier frequency, for example of approximately 400 THz, are for example not amplified by the signal amplifier 21 before being forwarded. The intensity modulation illustrated in FIG. 5 can be implemented particularly simply in terms of circuit technology. However, as already mentioned, it is also possible to use other modulation and demodulation methods, in particular at higher data transmission rates and in the frequency range of more closely adjacent transmission channels.

FIG. 9 shows a further exemplary embodiment of a system 1 according to the invention for localizing an attenuation change location for an optical waveguide 2. In this embodiment, the modulators 16-1, 16-2 comprise for example multipliers or controlled on/off switches. In the embodiment illustrated in FIG. 9, two different optical signals having different wavelengths $\lambda_1$, $\lambda_2$ are fed into the first end 7 of the optical waveguide 2 by the optical multiplexer 5 and are respectively separated from one another again by the optical demultiplexer 6 at the receiver end of the second end 8 of the optical waveguide 2. In the embodiment of the receiver 4 illustrated in FIG. 9, the demodulation of the separated optical signals is effected by means of demodulators 23-1, 23-2. The demodulators 23-1, 23-2 recover the bit sequence modulated on at the transmitter end. Two event detection units 24-1, 24-2 detect, on the basis of the received optical signal, whether or not an attenuation change has occurred in the optical waveguide 2. This is ascertained for example on the basis of the signal power of the received signal. The event detection units 24-1, 24-2 control, via control lines 25-1, 25-2 the signal amplifiers 21-1, 21-2 connected downstream of the modulators 23-1, 23-2, said signal amplifiers for their part having counters 26-1, 26-2 connected downstream of them. By means of the event detection units 24-1, 24-2, the receiver circuit can also detect attenuating changes, not just fibre fractures. The counters 26-1, 26-2 are reset by means of a reset unit 27 after each test operation. The two modulated optical signals having the wavelengths $\lambda_1, \lambda_2$ are detected by the receiver 4, wherein an associated digital counter 26-1, 26-2 is started upon each optical signal received. The two counters 26-1, 26-2 are subsequently reset. The two counters 26-1, 26-2 are actuated or count until the associated optical received signal having the corresponding wavelength $\lambda_1, \lambda_2$ is present at the receiver 4. If the transmission path or the optical waveguide 2 is interrupted owing to a fibre fracture, that counter 26-1, 26-2 stops first whose associated optical signal propagates with a higher propagation velocity within the optical waveguide 2 or has a shorter propagation time from the interruption location through to the receiver 4. After a propagation time difference, the second counter, which is associated with the more slowly propagating optical signal, also stops. In a manner triggered by the power decrease of both optical signals having different wavelengths $\lambda_1, \lambda_2$, both counters 26-1, 26-2 are subsequently read and the difference $\Delta Z$ between the counter readings is evaluated in order to determine the distance between the attenuation change location X and the second end 8 of the optical waveguide 2. By means of the difference $\Delta Z$ between the two counter readings and the known data rate DR of the signal modulated on or the frequency of the signal modulated on, the propagation time difference and finally the distance E between the disturbance location X and the receiver 4 are calculated by means of an evaluation unit 29.

The counters have a clock or counting frequency $F_z$:

$$F_z = \text{Counting pulses/time}$$

In the case of a "1010" data sequence, the number of logic high states, that is to say the number of "1", is counted and the counting frequency $F_z$ is equal to half the data rate DR. If both the rising and the falling edge of the data signal modulated on, that is to say of the "1010" data sequence, are counted, the counting frequency $F_z$ is equal to the data rate DR.

The count Z results from the difference between the two counter readings:

$$Z = |\text{counter value 26-1} - \text{counter value 26-2}|$$

The time difference $\Delta T$ between the signal change instants $t_1, t_2$ of the two optical signals having difference wavelengths $\lambda_1, \lambda_2$ results as follows:

$$\Delta T = Z/F_z$$

Figure 10:
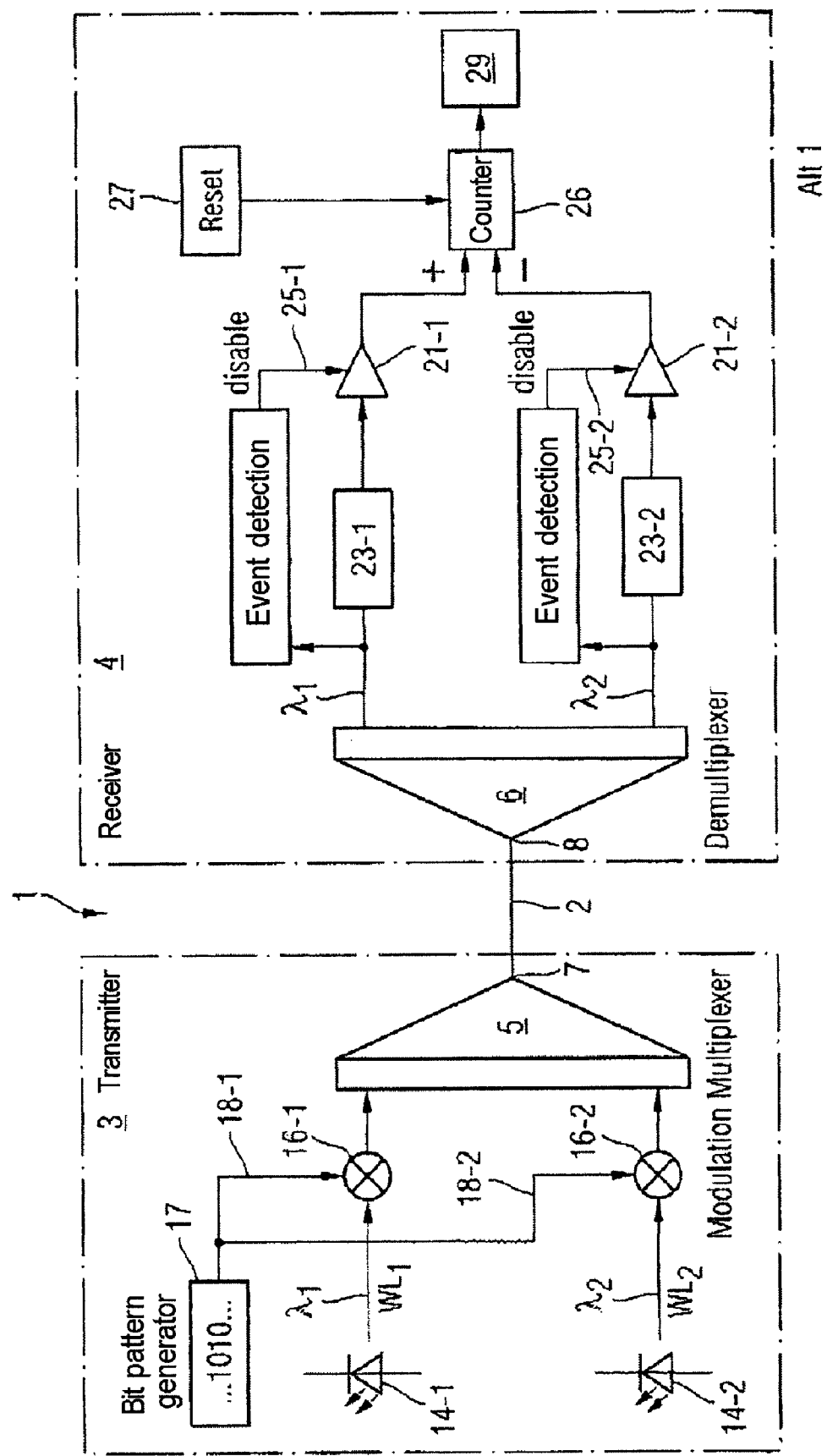
FIG. 10 shows a further block diagram for representing a further exemplary embodiment of the system according to the invention for localizing an attenuation change location in an optical waveguide.

FIG. 10 shows a further exemplary embodiment of the system 1 according to the invention for localizing an attenuation change location. In this embodiment, in contrast to the embodiment illustrated in FIG. 9, rather than two counters 26-1, 26-2, a single counter 26 is provided in the receiver 4. The counter 26 in the embodiment illustrated in FIG. 10 is incremented by the first transmitted optical signal having the wavelength $\lambda_1$ and decremented by the other optical signal having the second wavelength $\lambda_2$. At the beginning of the activity of the transmission system 1 and, if appropriate, at specific maintenance times, the counter 26 is reset by the reset unit 27. During operation, the two optical signals $\lambda_1, \lambda_2$ alternately increment and decrement the counter 26. After a fibre fracture in the optical waveguide 2, that optical signal which propagates more rapidly within the optical waveguide 2 on account of its wavelength fails, and only that optical signal which propagates more slowly within the optical waveguide 2 on account of its wavelength is received and can actuate the counter 26. Since the optical signal which propagates more slowly also fails or is attenuated, the counter reading Z of the counter 26 together with the data rate DR or the frequency of the signal modulated on reflects the difference between the signal change instants $t_1, t_2$ of the two transmitted optical signals having the wavelengths $\lambda_1, \lambda_2$. The counter reading Z is evaluated by the evaluation unit 29.

Figure 11:
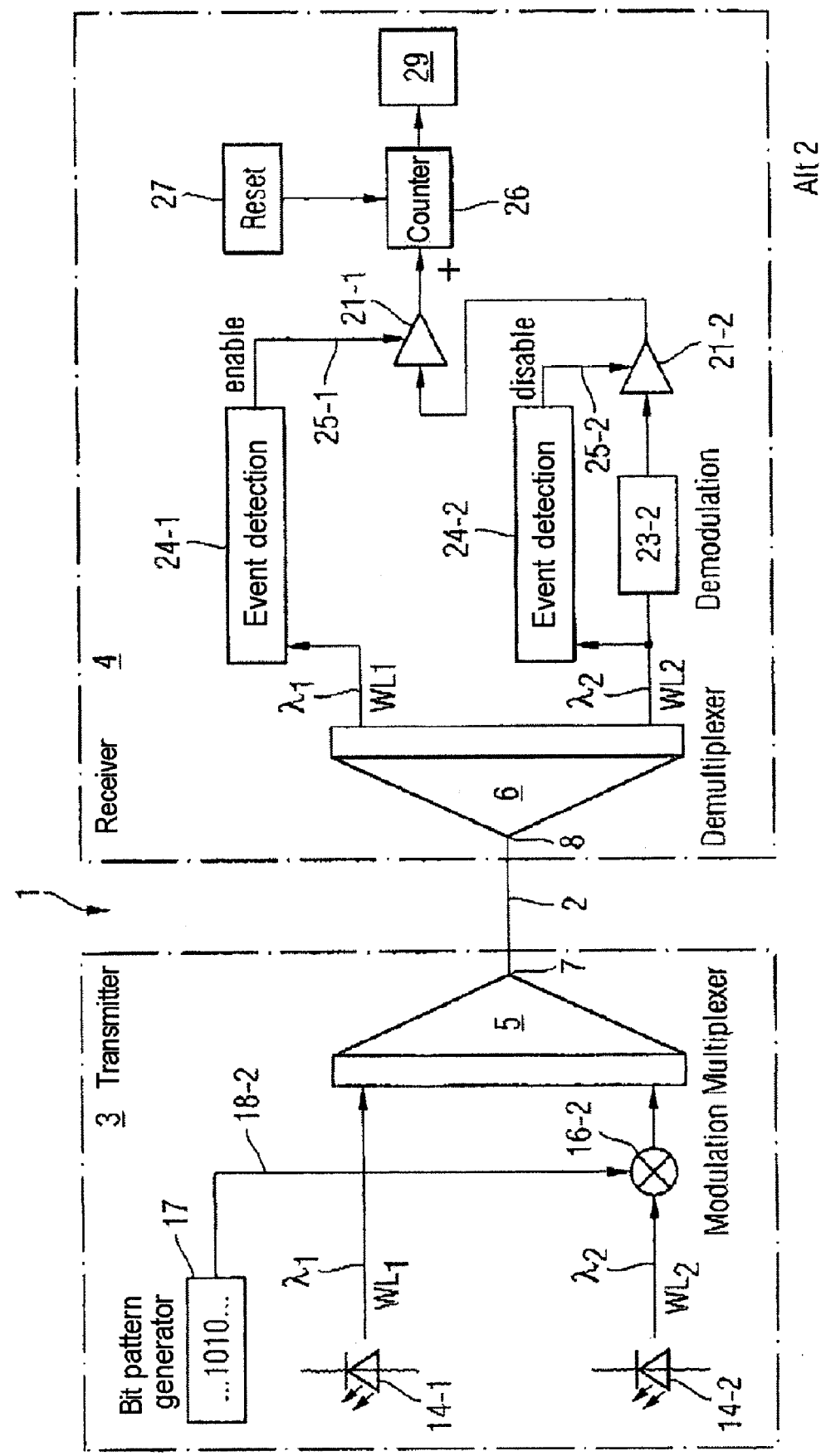
FIG. 11 shows a further block diagram for representing a further exemplary embodiment of the system according to the invention for localizing an attenuation change location in an optical waveguide.

FIG. 11 shows a further exemplary embodiment of the system 1 according to the invention for localizing an attenuation change location in an optical waveguide 2. In the embodiment illustrated in FIG. 11, only one of the two optical signals, namely the optical signal having the wavelength $\lambda_2$, is modulated with a data bit pattern sequence by means of a modulator 16-2 within the transmitter 3 and transmitted to the receiver 4 via the optical waveguide 2. The optical signal having the wavelength $\lambda_2$ is, in comparison with the optical signal having the wavelength $\lambda_1$, an optical signal which propagates more slowly within the optical waveguide 2. The optical signal having the wavelength $\lambda_1$, which propagates more rapidly within the optical waveguide 2, remains unmodulated in the exemplary embodiment illustrated in FIG. 11. After a fibre fracture within the optical waveguide 2, the decrease in the signal power in the case of the faster optical signal having the wavelength $\lambda_1$ is detected and the counter 26 within the receiver 4 is started with the optical signal having the other wavelength $\lambda_2$, for example as a result of the cessation of an inhibit signal. Since the more slowly propagating optical signal will then also fail or is attenuated, the counter reading Z of the counter 26 is a measure of the distance E between the attenuation location and the receiver 4.

Figure 12:
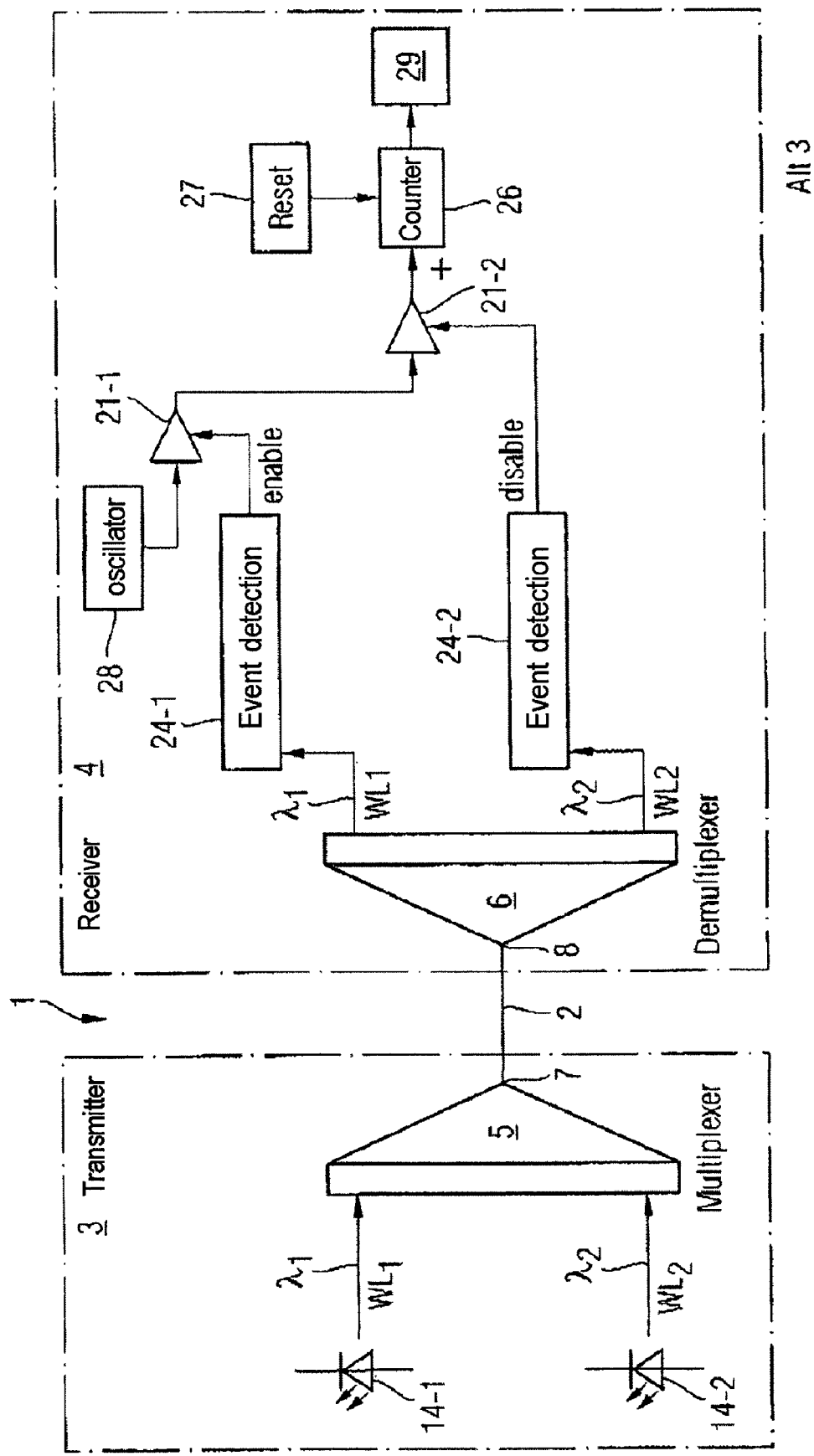
FIG. 12 shows a further block diagram for representing a further exemplary embodiment of the system according to the invention for localizing an attenuation change location in an optical waveguide.

FIG. 12 shows a further exemplary embodiment of the system 1 according to the invention for localizing an attenuation change location X within an optical waveguide 2. In this embodiment, both optical signals having the different wavelengths $\lambda_1, \lambda_2$ are transmitted to the receiver 4 via the optical waveguide 2 in unmodulated fashion. In the exemplary embodiment illustrated in FIG. 12, the optical signal having the wavelength $\lambda_1$ propagates within the optical waveguide 2 more rapidly than the optical signal having the wavelength $\lambda_2$. Upon cessation of the received optical signal having the wavelength $\lambda_1$, for example on account of a fibre fracture, the counter 26 is started, said counter being operated by an oscillator 28 provided in the receiver 4. If the second optical signal having the wavelength $\lambda_2$ also fails or is attenuated, the counter 26 is stopped. By means of the counter reading of the counter 26, the propagation time difference $\Delta T$ is determined depending on the frequency of the oscillator 28 and the distance E between the attenuation location X and the receiver 4 is calculated by this by the evaluation unit 29.

Figure 13:
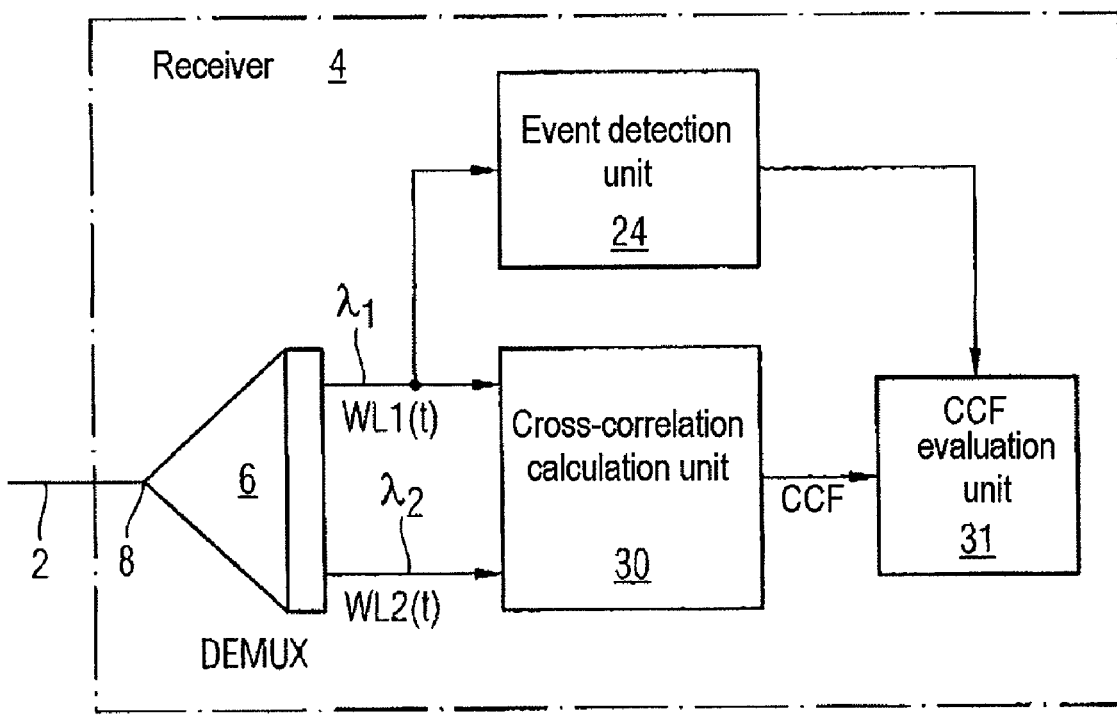
FIG. 13 shows a block diagram for representing a possible embodiment of a receiver within the system according to the invention for localizing an attenuation change location in an optical waveguide.

FIG. 13 shows a further exemplary embodiment of the system 1 according to the invention for localizing an attenuation location wherein the receiver 4 determines the time difference $\Delta T$ by means of cross-correlation. In the embodiment illustrated in FIG. 13, the two optical signals having the different wavelengths $\lambda_1$, $\lambda_2$, as in the embodiment illustrated in FIG. 12, are transmitted via the optical waveguide 2 in unmodulated fashion and are separated from one another by the optical demultiplexer 6. An event detection unit 24 detects the change in the signal power for triggering an evaluation unit 31. If a change in the signal power is ascertained, a cross-correlation calculation unit 30 within the receiver 4 calculates a cross-correlation function CCF from the time profiles of the two received signals $WL_1(t)$ and $WL_2(t)$:

$$CCF(\tau) = \frac{1}{2T}\int_{-\tau}^{+\tau} WL_1(t)WL_2(t-\tau)dt$$

The time 2T forms an observation interval. For different values of $\tau$ the system tests how well the two functions $WL_1$, $WL_2$ match, such that a function dependent on $\tau$ is calculated.

In this case, the maximum of the calculated cross-correlation function CCF determines the propagation time difference $\Delta T$. From the propagation time difference $\Delta T$ determined, the distance between the disturbance location X and the receiver 4 can in turn be calculated by means of the evaluation unit 31.

In a further embodiment (not illustrated) of the system 1 according to the invention for determining an attenuation change location or disturbance location, optical signals having different wavelengths $\lambda_1$, $\lambda_2$ are transmitted with time marker data patterns periodically modulated thereon via the optical waveguide 2. For the different wavelengths $\lambda_1$, $\lambda_2$, in this case the same data pattern is transmitted and a corresponding counter is sequentially incremented. The transmitted time markers are detected by the receiver 4. In the event of a fibre fracture or an increased attenuation, the time marker respectively received last is detected by means of the two received optical signals having the two different wavelengths $\lambda_1$, $\lambda_2$. The time difference between the reception of the two received time markers of the two transmitted optical signals, taking into account the predetermined frequency of the transmission of the time marker at the transmitter end, produces the time difference for calculating a distance between the transmitter 3 and the disturbance location X.

In a further embodiment of the system 1 according to the invention for detecting a disturbance location in an optical waveguide 2, optical signals having different wavelengths $\lambda_1$, $\lambda_2$ are fed in at both ends 7, 8 of the optical waveguide 2 and their signal power is measured at the respective opposite end of the optical waveguide 2. In this embodiment, a disturbance of the optical waveguide 2 can be detected from both ends. This embodiment has the advantage that the measurement accuracy can be increased. Moreover, there is an additional security that measurement results are available. Therefore, for the two measurement directions, it is possible to use different embodiments for determining the time difference $\Delta T$, such as are illustrated for example in connection with FIGS. 9 to 12. In the case of a measurement in both directions, at least four optical signals having four different wavelengths $\lambda_1$, $\lambda_2$, $\lambda_3$, $\lambda_4$ are used.

In further embodiments of the system 1 according to the invention for localizing an attenuation change location, it is also possible to use more than two optical signals having two different optical wavelengths $\lambda$ for measurement. If more than two optical signals having different wavelengths are used, it is possible to determine the propagation time difference between the wavelengths respectively used. By way of example, if three optical signals having three different wavelengths $\lambda_1$, $\lambda_2$, $\lambda_3$ are used, it is possible to determine the propagation time differences between the optical signal having the wavelength $\lambda_1$ and the optical signal having the wavelength $\lambda_2$, but also the propagation time difference between the optical signal having the wavelength $\lambda_2$ and the optical signal having the wavelength $\lambda_3$, as well as the propagation time difference between the optical signal having the wavelength $\lambda_1$ and the optical signal having the wavelength $\lambda_3$. By averaging the measurement results, the measurement accuracy can be increased in this embodiment.

In one embodiment, the system 1 according to the invention for localizing an attenuation change location can also use the WDM signals transmitted via the optical waveguide 2 instead of optical signals having a specific measurement wavelength $\lambda_1$, $\lambda_2$, particularly in those embodiments in which modulation of the monitoring signal is not required. For this purpose, part of the received signal power of the WDM channels is coupled out and, after electrical low-pass filtering, used instead of the unmodulated measurement signals for determining the attenuation change location.

With the system 1 according to the invention for localizing an attenuation change location, the spatial resolution capability is determined by the wavelength difference $\Delta\lambda$, the chromatic dispersion D of the optical waveguide 2 and the frequency or the data rate DR of the signal modulated on. Given a wavelength difference $\Delta\lambda$ of, for example, 300 nm ($\lambda_1$=1310 nm, $\lambda_2$=1610 nm), a modulation frequency of 4 GHz or 4 GB/sec and a dispersion D=10 ps/nm/km, it is possible to achieve a spatial resolution of 250 ps/10(ps/nm/km)/300 nm=0.083 km or approximately 100 m. If both the rising and the falling signal edge of the signal are detected by means of counters, the resolution can be increased again by a factor of 2. A higher resolution capability can also be achieved through the choice of the corresponding parameters.

Counters 26 having an N bit resolution, which represent numerical values from 0 to $2^{N-1}$, are used at the receiver end, that is to say within the receiver 4.

The measurement principle according to the invention is suitable not only for localizing an attenuation location X within an optical waveguide 2 but also for measuring the length L of the optical waveguide 2 between the first end 7 of the optical waveguide 2 and the second end 8 of the optical waveguide 2. In this case, the attenuation is brought about (artificially) at the first end 7 of the optical waveguide 2 by the opening of an optical switch provided there. In order to determine the length L of the optical waveguide 2, at least two optical signals having different wavelengths $\lambda_1$, $\lambda_2$ are fed in at the first end of the optical waveguide 2 and their signal power is measured at the second end 8 of the optical waveguide 2. An attenuation is brought about at a first end of the optical waveguide 2 by the opening of the switch. The length L of the optical waveguide 2 is determined depending on the time difference $\Delta T$ between the signal power change instants $t_1$, $t_2$ of the optical signals transmitted via the optical waveguide 2.

What is more, the measurement principle according to the invention is suitable for providing a method for the interception-proof signal transmission of optical data signals via an optical waveguide 2. For intercepting the optical data signal DS, the optical waveguide 2 is bent in order to couple out the optical data signal transmitted therein. The data signal attenuation brought about by the optical waveguide 2 increases as a result of the bending of the optical waveguide 2. Alongside the optical data signal DS, in this embodiment of the method according to the invention, two optical monitoring signals ÜS having different wavelengths $\lambda_1$, $\lambda_2$ are additionally fed in at the first end 7 of the optical waveguide 2. The signal power $P_s$ of the two optical monitoring signals ÜS is then measured at the second end 8 of the optical waveguide 2. The bending of the optical waveguide 2 for coupling out the optical data signal or optical data signals DS brings about an attenuation change, the location of which is determined depending on a time difference ΔT between the signal power change instants $t_1$, $t_2$ of the two optical monitoring signals ÜS transmitted via the optical waveguide. If, on account of the increase in the attenuation of the optical waveguide 2, there is the suspicion that the optical data signal DS is being intercepted, for example an interruption of the transmission of the optical data signal DS is instigated or the optical data signal DS is transmitted in encrypted fashion.

The invention claimed is:

1. A method for localizing an attenuation change location in an optical waveguide,
wherein an attenuation change location is determined depending on a time difference (ΔT) between signal power change instants of optical signals having different wavelengths (λ) that are transmitted via the optical waveguide,
wherein at least two optical signals (WL1, WL2) having different wavelengths ($\lambda_1$, $\lambda_2$) are inputted at a first end of the optical waveguide and a signal power of a respective received optical signal is measured at a second end of the optical waveguide.

2. The method according to claim 1,
wherein the at least two optical signals (WL1, WL2) are generated by a laser.

3. The method according to claim 2,
wherein the at least two optical signals (WL1, WL2) are inputted into the optical waveguide at the first end of the optical waveguide by an optical multiplexer.

4. The method according to claim 3,
wherein the at least two optical signals (WL1, WL2) are separated at a second end of the optical waveguide by an optical demultiplexer.

5. The method according to claim 1,
wherein a distance E between an attenuation change location and the second end of the optical waveguide is determined as follows:

$$E = \frac{|t_1 - t_2|}{D_{av}|\lambda_1 - \lambda_2|} = \frac{\Delta T}{D_{av}\Delta\lambda}$$

where
$t_1$ is a signal power change instant of a first optical signal,
$t_2$ is a signal power change instant of a second optical signal,
$\lambda_1$ is the wavelength of the first optical signal,
$\lambda_2$ is the wavelength of the second optical signal,
$D_{av}$ is an average dispersion coefficient,
$\Delta\lambda$ is a wavelength difference between the wavelengths $\lambda_1$, $\lambda_2$ of the first and second optical signals, and
ΔT is the time difference between the signal change instants $t_1$, $t_2$.

6. The method according to claim 1,
wherein the time difference ΔT is determined by counters at the second end of the optical waveguide.

7. The method according to claim 1,
wherein the at least two optical signals (WL1, WL2) are transmitted in unmodulated or modulated fashion by the optical waveguide.

8. The method according to claim 1,
wherein the at least two optical signals comprise at least two modulated optical signals having different wavelengths ($\lambda_1$, $\lambda_2$) are transmitted by the optical waveguide.

9. The method according to claim 1,
wherein the at least two optical signals comprise a modulated optical signal having a first wavelength ($\lambda_1$) and an unmodulated optical signal having a second wavelength ($\lambda_2$) are transmitted by the optical waveguide.

10. The method according to claim 1,
wherein optical signals having different wavelengths ($\lambda_1$, $\lambda_2$) are inputted at both ends of the optical waveguide and a signal power of the optical signals is measured at respective opposite ends of the optical waveguide.

11. The method according to claim 1,
wherein the at least two optical signals comprise at least two unmodulated optical signals having different wavelengths ($\lambda_1$, $\lambda_2$) are transmitted by the optical waveguide,
wherein when an attenuation change is ascertained, a cross-correlation function for the two transmitted optical signals is calculated, the maximum of which indicates the time difference (ΔT) between the signal power change instants.

12. The method according to claim 1,
wherein the at least two optical signals having different wavelengths and time marker data patterns periodically modulated thereon are transmitted by the optical waveguide.

13. The method according to claim 1,
wherein a total length (L) of the optical waveguide is determined in a reference measurement.

14. The method according to claim 13,
wherein the total length (L) of the optical waveguide is determined by bringing about an attenuation of two optical signals having different wavelengths ($\lambda_1$, $\lambda_2$) at the first end of the optical waveguide.

15. The method according to claim 14,
wherein the attenuation is brought about by an optical switch.

16. A system for localizing an attenuation change location in an optical waveguide,
wherein the attenuation change location is determined depending on a time difference (ΔT) between signal power change instants of optical signals having different wavelengths ($\lambda_1$, $\lambda_2$) that are transmitted by the optical waveguide,
wherein at least two optical signals (WL1, WL2) having different wavelengths ($\lambda_1$, $\lambda_2$) are inputted at a first end of the optical waveguide and a signal power of a respective received optical signal is measured at a second end of the optical waveguide.

17. The system according to claim 16, comprising:
a transmitter that feeds the at least two optical signals (WL1, WL2) having different wavelengths ($\lambda_1$, $\lambda_2$) into an optical waveguide; and
a receiver, which measures a time difference (ΔT) between signal power change instants of the optical signals transmitted by the optical waveguide and determines an attenuation change location from the measured time difference (ΔT).

18. The system according to claim 17,
wherein the transmitter has a controllable optical multiplexer that inputs the at least two optical signals (WL1, WL2) having different wavelengths (λ) into the optical waveguide.

19. The system according to claim 17,
wherein the transmitter has lasers that generate the at least two optical signals (WL) having different wavelengths (λ).

20. The system according to claim 17,
wherein the transmitter is provided with modulators by which an associated optical signal is modulated by a data bit pattern generated by a bit pattern generator.

21. The system according to claim 17,
wherein the receiver has a controllable optical demultiplexer that separates the transmitted optical signals having different wavelengths ($\lambda_1$, $\lambda_2$).

22. The system according to claim 21,
wherein the receiver has, for each transmitted separated optical signal, a detector that detects a signal power change in the transmitted optical signal.

23. The system according to claim 22,
wherein the detectors provided in the receiver trigger at least one counter for measuring the time difference ($\Delta T$) between the signal power change instants of the optical signals transmitted by the optical waveguide.

24. The system according to claim 17,
wherein the receiver is provided with a cross-correlation calculation unit, which, when a signal power change is ascertained, calculates a cross-correlation function (CCF) for two transmitted optical signals, the maximum of which indicates the time difference ($\Delta T$) between the signal power change instants.

25. The system according to claim 16,
wherein the attenuation change location is an optical waveguide fracture.

26. The system according to claim 16,
wherein the attenuation change location is a bending location of the optical waveguide.

27. The system according to claim 16,
wherein the optical waveguide comprises glass.

28. The system according to claim 16,
wherein the optical waveguide comprises plastic.

29. A receiver for localizing an attenuation change location for an optical waveguide,
wherein the receiver measures a time difference ($\Delta T$) between signal power change instants of at least two optical signals having different wavelengths ($\lambda$) that are transmitted by the optical waveguide, and determines an attenuation change location from the measured time difference ($\Delta T$),
wherein at least two optical signals having different wavelengths ($\lambda_1$, $\lambda_2$) are inputted at a first end of the optical waveguide and the signal power of the respective received optical signal is measured at a second end of the optical waveguide.

30. The receiver according to claim 29,
wherein the receiver has:
an optical demultiplexer that separates the transmitted optical signals having different wavelengths ($\lambda$);
detectors that detect a signal power change of an associated separated optical signal;
at least one counter which can be triggered for measuring a time difference ($\Delta T$) between signal power change instants of the separated optical signals by the detectors; and
an evaluation unit, which determines the attenuation location depending on the measured time difference ($\Delta T$).

31. The receiver according to claim 29,
wherein the receiver has:
an optical demultiplexer that separates the transmitted optical signals having different wavelengths ($\lambda_1$, $\lambda_2$);
a cross-correlation calculation unit, which, when a signal power change is ascertained, calculates a cross-correlation function for two separated transmitted optical signals, the maximum of which indicates the time difference ($\Delta T$) between the signal power change instants; and
an evaluation unit which determines the attenuation change location depending on the time difference ($\Delta T$).

* * * * *